(12) United States Patent
Masuda (10) Patent No.: US 10,759,399 B2
(45) Date of Patent: Sep. 1, 2020

(54) ELECTRIC BRAKE DEVICE (71) Applicant: NTN CORPORATION, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/364,867

(22) Filed: Mar. 26, 2019

(65) Prior Publication Data
US 2019/0217830 A1 Jul. 18, 2019

Related U.S. Application Data (63) Continuation of application No. PCT/JP2017/034490, filed on Sep. 25, 2017.

(30) Foreign Application Priority Data

Sep. 28, 2016 (JP) .................................. 2016-189174

(51) Int. Cl.
*B60T 8/17* (2006.01)
*B60T 13/74* (2006.01)
(Continued)

(52) U.S. Cl.
CPC ................ *B60T 8/17* (2013.01); *B60T 1/065* (2013.01); *B60T 8/171* (2013.01); *B60T 8/172* (2013.01);
(Continued)

(58) Field of Classification Search
CPC . B60T 8/17; B60T 1/065; B60T 8/171; B60T 8/172; B60T 13/74; B60T 13/746;
(Continued)

(56) References Cited

U.S. PATENT DOCUMENTS 6,230,854 B1 5/2001 Schwarz et al.
7,810,616 B2 10/2010 Nakazeki
(Continued)

FOREIGN PATENT DOCUMENTS

EP 1892164 A2 2/2008
JP 6-327190 11/1994
(Continued)

OTHER PUBLICATIONS

English Translation by WIPO of the International Preliminary Report on Patentability dated Apr. 11, 2019 in corresponding International Patent Application No. PCT/JP2017/034490 (7 pages).
(Continued)

*Primary Examiner* — Melanie Torres Williams (57) ABSTRACT

Provided is an electric brake device of which braking control accuracy is improved as a result of hysteresis in a load sensor being appropriately compensated for. The electric brake device includes: a direct load estimator configured to estimate a brake pressing force, using an output of the load sensor; an indirect load estimator configured to estimate a brake pressing force without using the output of the load sensor; and a hysteresis interpolator. When switching is performed between pressure increase and pressure decrease which causes hysteresis in the load sensor, the hysteresis interpolator performs control by use of the load estimated by the indirect load estimator without using the load sensor, in a predetermined range after the switching has been performed.

7 Claims, 4 Drawing Sheets

(51) Int. Cl.
*F16D 65/18* (2006.01)
*B60T 17/22* (2006.01)
*H02P 3/18* (2006.01)
*H02P 23/14* (2006.01)
*B60T 8/172* (2006.01)
*B60T 1/06* (2006.01)
*F16D 55/02* (2006.01)
*B60T 8/171* (2006.01)
*F16D 125/48* (2012.01)
*F16D 121/24* (2012.01)

(52) U.S. Cl.
CPC ............ *B60T 13/74* (2013.01); *B60T 13/746* (2013.01); *B60T 17/221* (2013.01); *F16D 55/02* (2013.01); *F16D 65/18* (2013.01); *H02P 3/18* (2013.01); *H02P 23/14* (2013.01); *B60T 2270/413* (2013.01); *F16D 2121/24* (2013.01); *F16D 2125/48* (2013.01)

(58) Field of Classification Search
CPC .. B60T 17/221; B60T 2270/413; F16D 55/02; F16D 65/18; F16D 2121/24; H02P 3/18; H02P 3/14
USPC ....................................................... 701/70, 71
See application file for complete search history.

(56) References Cited

U.S. PATENT DOCUMENTS

| 9,981,648 | B2 | 5/2018 | Masuda | |
|---|---|---|---|---|
| 2008/0048596 | A1 | 2/2008 | Konishi et al. | |
| 2008/0110704 | A1 | 5/2008 | Nakazeki | |
| 2014/0158479 | A1* | 6/2014 | Takahashi | G01L 5/12 188/72.1 |
| 2015/0081186 | A1* | 3/2015 | Yasui | B60T 13/741 701/70 |
| 2016/0091039 | A1* | 3/2016 | Masuda | B60T 13/741 188/72.1 |
| 2017/0066428 | A1 | 3/2017 | Masuda | |
| 2017/0072931 | A1* | 3/2017 | Masuda | B60T 8/00 |
| 2017/0108067 | A1* | 4/2017 | Masuda | F16D 55/226 |
| 2017/0182984 | A1 | 6/2017 | Masuda | |

FOREIGN PATENT DOCUMENTS

| JP | 2001-507779 | | 6/2001 |
| JP | 2002225690 | A * | 8/2002 |
| JP | 2006-194356 | | 7/2006 |
| JP | 2008-49800 | | 3/2008 |
| JP | 2015-217913 | | 12/2015 |
| JP | 2016-64815 | | 4/2016 |

OTHER PUBLICATIONS

International Search Report dated Dec. 26, 2017 in corresponding International Application No. PCT/JP2017/034490.
Extended European Search Report and Supplementary European Search Report dated Mar. 12, 2020 in European Patent Application No. 17856038.9.

* cited by examiner

ELECTRIC BRAKE DEVICE

CROSS REFERENCE TO THE RELATED APPLICATION

This application is a continuation application, under 35 U.S.C. § 111(a), of international application No. PCT/JP2017/034490, filed Sep. 25, 2017, which is based on and claims Convention priority to Japanese Patent Application No. 2016-189174, filed Sep. 28, 2016, the entire disclosure of which is herein incorporated by reference as a part of this application.

BACKGROUND OF THE INVENTION

Field of the Invention

The present invention relates to an electric brake device to be used in automobiles, industrial machines, machine tools, transporting machines, and the like.

Description of Related Art

Conventionally, an electric brake actuator that uses an electric motor, a linear motion mechanism, and a speed reducer or reduction gear (Patent Document 1), and an electric actuator that uses a planetary roller mechanism and an electric motor (Patent Document 2) have been proposed. An electric brake that detects pressing force by use of a strain gauge has also been proposed (Patent Document 3).

RELATED DOCUMENT

Patent Document

[Patent Document 1] JP Laid-open Patent Publication No. H06-327190

[Patent Document 2] JP Laid-open Patent Publication No. 2006-194356

[Patent Document 3] Japanese Translation of PCT International Application Publication No. 2001-507779

For example, in an electric brake device using an electric actuator as in Patent Documents 1 to 3, if a uniaxial load sensor that detects a pressing force of a friction member as in Patent Document 3 is provided such that the pressing force is controlled, it is conceivable that inexpensive and highly accurate control can be realized. At this time, for example, if a displacement sensor or a strain sensor is applied as the load sensor to a member that is deformed in association with a pressing operation, and the displacement, strain, or the like is converted into a pressing force on the basis of a correlation obtained in advance, an inexpensive and space-saving pressing force sensor can be configured.

However, the deformation associated with this pressing operation is often caused by a force transmitted through a contact portion where a plurality of components are in contact with each other for improving environmental resistance of the sensor or facilitating manufacturing of components of the actuator. At this time, due to the friction force or the like at the contact portion, hysteresis could occur in the correlation between the actual pressing force and the sensor output, thereby causing reduced detection accuracy.

As a countermeasure for this, for example, if a sensor or the like is to be directly provided at the friction member or in the vicinity thereof, the sensor is required to withstand the frictional heat generated between the brake rotor and the friction member. Thus, such a configuration is very difficult to be realized. As another countermeasure, if the frictional contact portion (the contact portion described above) which could cause hysteresis is to be eliminated, it is very difficult to configure components as a single member having no contact portion, from the viewpoint of manufacturing the components and the assembling process.

SUMMARY OF THE INVENTION

In order to solve the above problem, an object of the present invention is to provide an electric brake device in which: hysteresis in a load sensor is appropriately compensated for, whereby the control accuracy of braking is improved; hysteresis is allowed in the load sensor whereby designing is facilitated; and thus, low costs and space-saving designing are enabled.

Hereinafter, in order to facilitate understanding of the present invention, the present invention will be described with reference to the reference numerals in embodiments for the sake of convenience.

An electric brake device of the present invention includes an electric brake actuator 1 and an electric brake control device 2. The electric brake actuator 1 includes a brake rotor 7, a friction member 8 to be brought into contact with the brake rotor 7, an electric motor 3, a friction member operator 9 configured to bring the friction member 8 and the brake rotor 7 into contact with each other by the electric motor 3, and a load sensor 6 configured to detect a value that corresponds to a pressing force generated at a contact face between the friction member 8 and the brake rotor 7 by the friction member operator 9. The electric brake control device 2 includes a main controller 11 configured to perform follow-up control on the pressing force at the contact face between the friction member 8 and the brake rotor 7 in accordance with a command value provided from a brake operator 9.

In the electric brake device having this configuration, the electric brake control device 2 includes a direct load estimator 17 configured to estimate the pressing force, using an output of the load sensor 6, an indirect load estimator 18 configured to estimate the pressing force without using the output of the load sensor 6, and a hysteresis interpolator 19, the direct load estimator 17 includes a first-estimation-correlation-using estimation unit 17a configured to estimate the pressing force on the basis of a first estimation correlation, which is a correlation between a pressure increase amount of the pressing force and an output change of the load sensor 6, and a second-estimation-correlation-using estimation unit 17b configured to estimate the pressing force on the basis of a second estimation correlation, which is a correlation between a pressure decrease amount of the pressing force and an output change of the load sensor 6, the hysteresis interpolator 19 includes a pressure increase/decrease switching determination unit 19a and a control switching unit 19b, the pressure increase/decrease switching determination unit 19a performs determination as to switching from a pressure increase operation to a pressure decrease operation, for the pressing force, and determination as to switching from a pressure decrease operation to a pressure increase operation, for the pressing force, and when the main controller 11 performs load follow-up control based on the pressing force estimated by the first or second-estimation-correlation-using estimation unit 17a, 17b and outputted by the direct load estimator 17, the control switching unit 19b causes the main controller 11 to perform follow-up control based on the indirect load estimator 18, in a state until a drive amount of the electric brake actuator 1 reaches a predetermined amount after the switching between the pressure increase operation and the pressure decrease operation in line with a determination result by the pressure increase/decrease switching determination unit 19a has been performed, and the control switching unit 19b causes the main controller 11 to perform, in a state after the drive amount of the electric brake actuator 1 has exceeded the predetermined amount, load follow-up control based on the pressing force estimated by the first or second-estimation-correlation-using estimation unit 17a, 17b of a correlation type different from that used before the switching between the pressure increase operation and the pressure decrease operation has been performed.

According to this configuration, in the electric brake device which controls the contact load between the friction member 8 and the brake rotor 7 by use of the load sensor 6, when switching is performed between pressure increase and pressure decrease which causes hysteresis in the load sensor 6, control is performed without using the load sensor 6 in a predetermined range after the switching has been performed. In the predetermined range, control is performed by use of the load estimated by the indirect load estimator 18 on the basis of a correlation or the like between the angle and the load dependent on the rigidity of the electric brake device. Accordingly, the hysteresis in the load sensor 6 is appropriately compensated for, and the control accuracy of the electric brake device is improved. In addition, since the hysteresis is allowed in the load sensor 6, designing is facilitated, and low costs and space-saving designing are enabled.

In the present invention, the electric brake device may include an angle estimator configured to estimate an angle of the electric motor 3, wherein the indirect load estimator 18 may estimate the pressing force on the basis of a correlation between the pressing force and the angle of the electric motor 3 estimated by the angle estimator. The correlation between the brake load and the motor angle is generated dependent on the rigidity of the electric brake device, and thus, feedback control based on the motor angle is enabled. Although it is difficult for the load estimation by the indirect load estimator 18 to attain high accuracy, if the load estimation by the indirect load estimator 18 is used in a limited range, a pressing force estimation having good accuracy to some extent can be performed.

In the present invention, the electric brake device may include a current estimator configured to estimate a current of the electric motor 3, wherein the indirect load estimator 18 may estimate the pressing force on the basis of a correlation between the pressing force and the current of the electric motor 3. The correlation between the brake load and the motor current is dependent on the efficiency of the electric brake actuator, the motor characteristics, or the like, and thus, feedback control based on the motor current is enabled. Although it is difficult for the load estimation by the indirect load estimator 18 to attain high accuracy, if the load estimation by the indirect load estimator 18 is used in a limited range, a pressing force estimation having good accuracy to some extent can be performed.

In the present invention, the electric brake device may include an angle estimator configured to estimate an angle of the electric motor 3, wherein by use of the angle estimated by the angle estimator, the pressure increase/decrease switching determination unit 19a may determine switching between a pressure increase operation and a pressure decrease operation in a situation where a changing direction of the angle of the electric motor 3 is reversed. For example, in such a case where the hysteresis in the load sensor 6 is relatively large, it is difficult to perform determination as to switching between a pressure increase operation and a pressure decrease operation, on the basis of the load sensor 6. However, also in such a case, the determination can be easily performed on the basis of the angle of the motor.

In the present invention, the electric brake device may include an angle estimator configured to estimate an angle of the electric motor 3, wherein on the basis of a change amount of the angle of the electric motor, the control switching unit 19b may perform determination as to a drive amount of the electric brake actuator 1 at a time of performing switching from the indirect load estimator 18 to the direct load estimator 17. It is difficult to perform determination as to switching between a pressure increase operation and a pressure decrease operation, on the basis of the load sensor 6. However, the determination can be performed on the basis of the drive amount of the electric brake actuator 1.

In the present invention, on the basis of a change amount of the output of the load sensor 6, the control switching unit 19b may perform determination as to a drive amount of the electric brake actuator 1 at a time of performing switching from the indirect load estimator 18 to the direct load estimator 17. For example, when the hysteresis in the load sensor 6 is relatively small, whether or not to switch to the load follow-up control can be appropriately determined by use of the output of the load sensor.

In the present invention, the electric brake actuator 1 may perform braking of a wheel of an automobile. When the electric brake actuator 1 is applied to braking of an automobile, the effect of the present invention that the hysteresis in the load sensor 6 is appropriately compensated for and thus the braking control accuracy is improved can be effectively obtained in terms of improvement of the safety of travel and the driving feeling. In addition, since the hysteresis is allowed, designing is facilitated, and since the space-saving design is enabled, the space in the interior of the vehicle can be increased.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
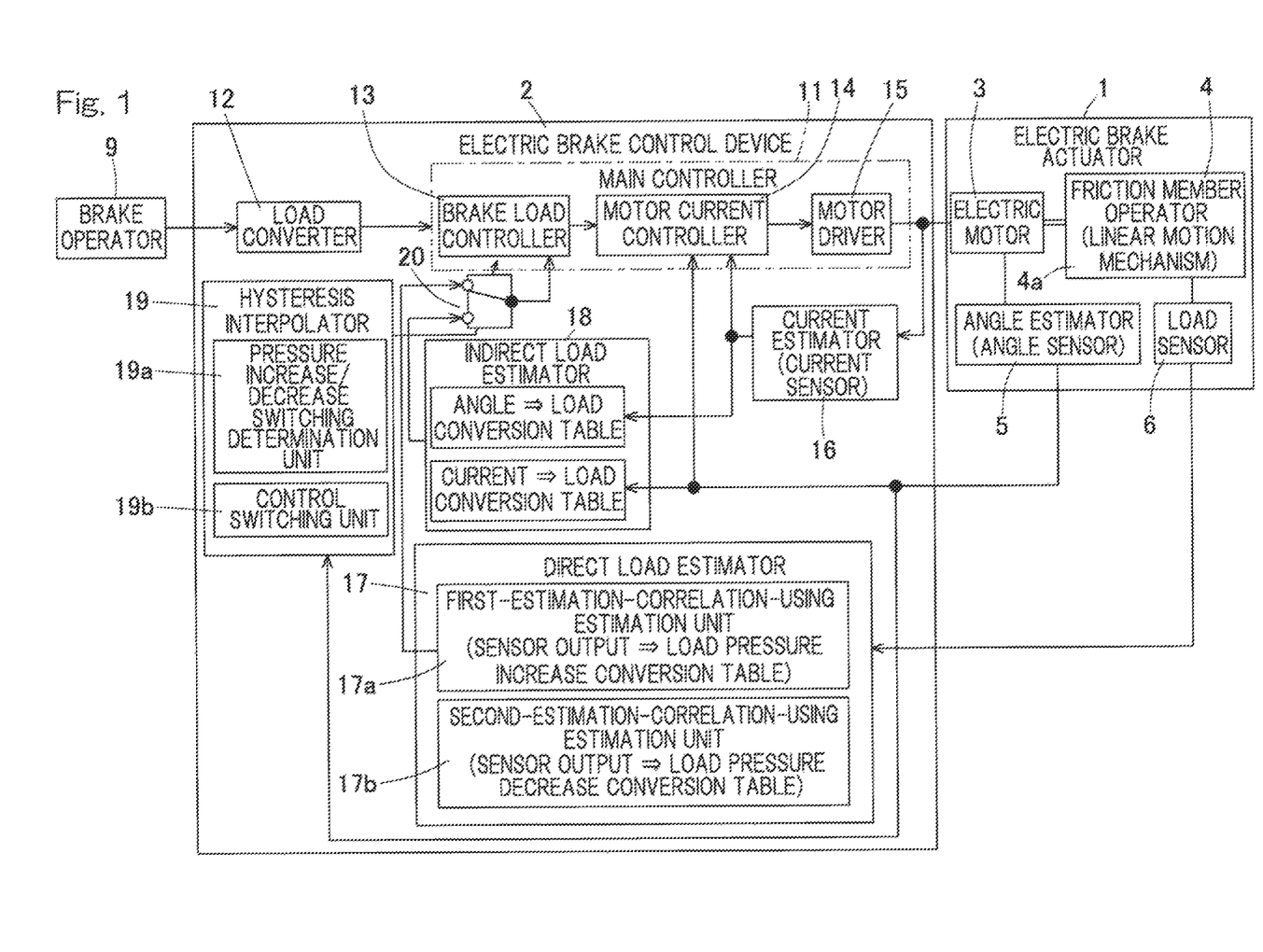
FIG. 1 is a block diagram showing a conceptual configuration of an electric brake device according to one embodiment of the present invention.

One embodiment of the present invention is described with reference to FIG. 1 to FIG. 4. FIG. 1 shows a configuration example of an electric brake device including an electric brake actuator (hereinafter, simply referred to as electric actuator) 1 and an electric brake control device 2. This configuration example mainly shows components that are necessary for this embodiment, and components such as a power supply device and other sensors (e.g., a thermistor) that are necessary for an actual system configuration are provided as appropriate, irrespective of the expression of this drawing. This electric brake device is used in, for example, braking of a wheel of an automobile (not shown), or braking of a rotational drive unit in an industrial machine, a machine tool, or a transporting machine.

The electric actuator 1 includes: an electric motor 3; a friction member operator 4 having a linear motion mechanism 4a or the like; an angle estimator 5 implemented by an angle sensor or the like; and a load sensor 6 implemented by a pressing force sensor or the like.

Figure 4:
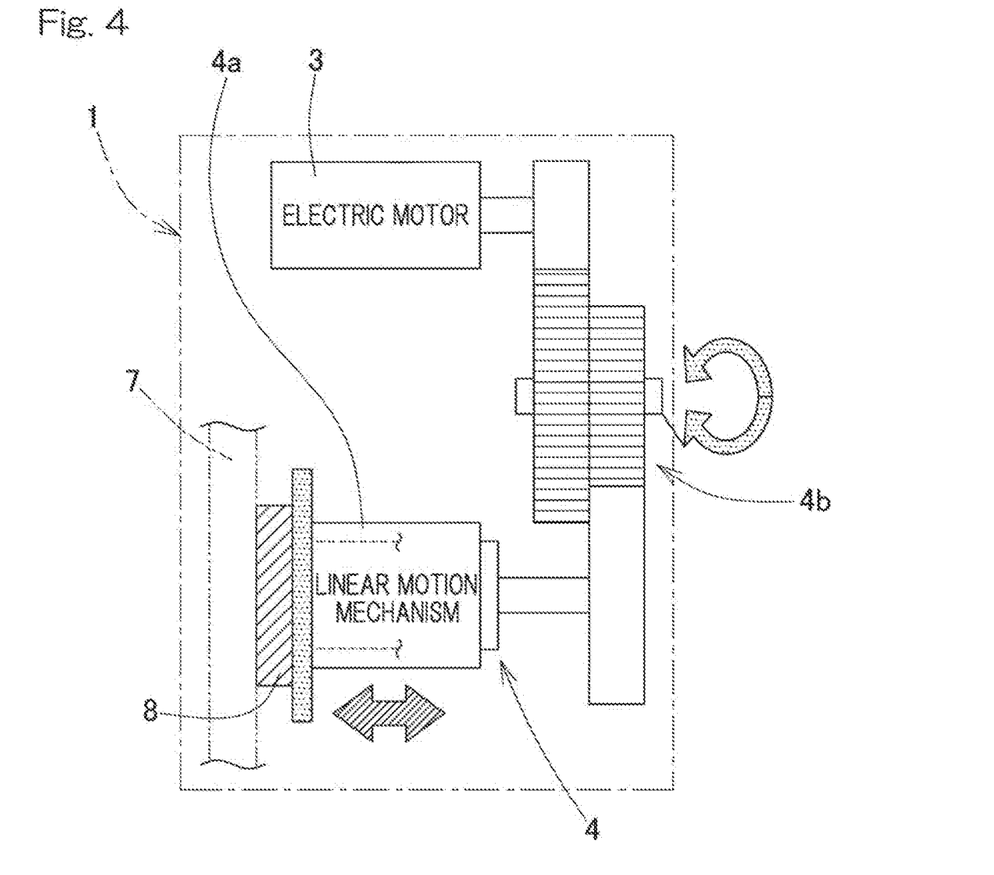
FIG. 4 is a front view showing a configuration example of an electric brake actuator of the electric brake device.

As shown in FIG. 4, specifically, the electric actuator 1 includes a brake rotor 7 and a friction member 8. The electric actuator 1 generates a braking force by causing the friction member 8 to be in contact with the brake rotor 7 while being pressed thereto via the friction member operator 4 due to rotation of the electric motor 3. The brake rotor 7 may be a brake disc or a brake drum. The friction member 8 is implemented as a brake pad or the like. The friction member operator 4 includes: the linear motion mechanism 4a described later which converts transmitted rotary motion into linear motion so as to cause the friction member 8 to advance/retract; and a speed reducer or reduction gear 4b which reduces the speed of rotary motion of the electric motor 3 to transmit the reduced speed rotation to the linear motion mechanism 4a. The electric motor 3 is configured as a permanent magnet synchronous motor, for example, and in that case, such a configuration saves space and realizes high torque, and thus, is preferable. Alternatively, the electric motor 3 may be a DC motor using a brush, a reluctance motor not using a permanent magnet, an induction motor, or the like. The linear motion mechanism 4a is implemented by various types of screw mechanisms such as a planetary roller screw or a ball screw, a ball ramp, or the like, and it is possible to use various types of mechanisms that convert rotary motion into linear motion through operation or the like along the inclined-shaped structure in the circumferential direction of the rotational shaft included in such mechanisms.

As the angle estimator 5 shown in FIG. 1, if a resolver, a magnetic encoder, or the like is used, high accuracy and high reliability are realized and thus, such a configuration is preferable. However, various types of sensors such as an optical encoder can also be used. The angle estimator 5 may perform, without using an angle sensor, sensorless angle estimation in which the motor angle is estimated on the basis of the relationship or the like between voltage and current.

As the load sensor 6, it is possible to use a magnetic sensor, a strain sensor, a pressure sensor, or the like that detects displacement, for example.

The brake control device 2 controls the electric brake actuator 1 in accordance with a command value provided from a brake operator 9. As a basic configuration, the brake control device 2 includes a load converter 12, and a main controller 11 which performs follow-up control so as to cause the pressing force at the contact face between the friction member 8 and the brake rotor 7 in FIG. 4 to follow the command value outputted by the brake operator 9.

The load converter 12 converts the command value that corresponds to the operation from the brake operator 9, into a load command value. This conversion may be performed by referring to a predetermined look-up table (not shown), or may be a calculation performed as appropriate by using a formula or the like that performs predetermined calculation.

The main controller 11 includes a brake load controller 13, a motor current controller 14, and a motor driver 15. The brake load controller 13 performs servo control so as to cause the pressing force to follow the command value (load command value) for the pressing force, through feedback control. As the control form of the brake load controller 13, PID control, state feedback control, nonlinear control, adaptive control, or the like can be used as appropriate. FIG. 1 shows an example in which, as a manipulation amount outputted by the brake load controller 13, the brake load controller 13 outputs a motor current command value. When this current command value is to be generated, if a current map, a current derivation formula, or the like corresponding to the torque or the rotation speed (or the number of rotation per unit time) is used, highly-efficient motor control can be performed. However, the control system forming the main controller 11 is not limited to the configuration shown in FIG. 1, and an angular velocity controller or an angle controller may be used, for example.

The motor current controller 14 performs servo control so as to cause a feedback current, which is a motor drive current detected by a current estimator 16 implemented by a current sensor or the like, to follow the motor current command value. As the control form, the motor current controller 14 can use PID, state feedback, nonlinear control, adaptive control, or the like as appropriate, and may use feedforward control represented by noninteracting control in combination. The brake load controller 13 and the motor current controller 14 may be configured as a controller having an equation of motion including these two functions, to form one control calculation loop. As the current estimator 16, a non-contact type that detects the magnetic field of the electric line may be used, or a type may be employed in which a shunt resistor or the like is provided to the electric line and detection is performed on the basis of the voltage across opposite ends. Alternatively, as the current estimator 16, a type may be employed in which detection is performed on the basis of the voltage or the like at a predetermined position of a circuit forming the motor driver 15 described later.

The motor driver 15 applies a motor current to the electric motor 3 in accordance with the output from the motor current controller 14. For example, the motor driver 15 converts a direct current of a battery into an alternating current power by a half-bridge circuit using a switching element such as a FET. The motor driver 15 is configured to perform PWM control in which, when the converted alternating current is to be applied to the electric motor 3, the voltage applied to the motor is determined on the basis of a predetermined duty ratio with respect to the voltage applied to the switching element. The motor driver 15 may be configured to perform PAM control, instead of the PWM control, with a transformation circuit or the like (not shown) provided.

In this embodiment, the electric brake control device 2 having the basic configuration as described above includes a direct load estimator 17, an indirect load estimator 18, and a hysteresis interpolator 19 described below. The direct load estimator 17 estimates the pressing force, using the output of the load sensor 6. The indirect load estimator 18 estimates the pressing force without using the output of the load sensor 6, and performs load estimation on the basis of a correlation or the like between the output of the load sensor and the state quantity of a component other than the load sensor obtained in advance.

The direct load estimator 17 includes a first-estimation-correlation-using estimation unit 17a and a second-estimation-correlation-using estimation unit 17b. The first-estimation-correlation-using estimation unit 17a estimates the pressing force during pressure increase on the basis of a correlation between the output change of the load sensor 6 and the pressure increase amount of the pressing force, i.e., a first estimation correlation which is a correlation between the output of the load sensor 6 and the actual brake load when the brake load is increased. The second-estimation-correlation-using estimation unit 17b estimates the pressing force during pressure decrease on the basis of a correlation between the output change of the load sensor 6 and the pressure decrease amount of the pressing force, i.e., a second estimation correlation which is a correlation between the output of the load sensor 6 and the actual brake load when the brake load is decreased. The first and second estimation correlations are set in the respective estimation units 17a, 17b, as a sensor output-load pressure increase conversion table, and a sensor output-load pressure decrease conversion table, for example. Instead of using the tables, direct calculation by a predetermined function may be performed.

The indirect load estimator 18 estimates the pressing force without using the output of the load sensor 6 as described above. For example, the indirect load estimator 18 may perform the estimation on the basis of a correlation between the brake load and the motor angle dependent on the rigidity or the like of the electric brake actuator 1, may perform the estimation on the basis of a correlation between the brake load and the motor current dependent on the efficiency of the electric brake actuator, the motor characteristics, or the like, or may use these approaches in combination as appropriate. When the correlation between the motor angle and the brake load is used, the load is estimated by use of a motor angle estimated by an angle estimator 5. When the correlation between the motor current and the brake load is used, the load is estimated by use of a motor current detected by the current estimator 16. Also with respect to the estimation by the indirect load estimator 18, a conversion table may be used, or direct calculation by a predetermined function may be used, as in the case described above.

The hysteresis interpolator 19 mainly reduces the influence of hysteresis which is caused in the correlation between the actual load and the load sensor output in association with switching between pressure increase and pressure decrease. The hysteresis interpolator 19 includes a pressure increase/decrease switching determination unit 19a and a control switching unit 19b. The pressure increase/decrease switching determination unit 19a performs determination as to switching from a pressure increase operation, for the pressing force of the electric brake actuator 1, to a pressure decrease operation, and determination as to switching from a pressure decrease operation, for the pressing force, to a pressure increase operation. Specifically, the pressure increase/decrease switching determination unit 19a detects a state where the motion of the linear motion mechanism 4a has been changed from a pressure increasing motion to a pressure decreasing motion, and conversely, a state where the motion of the linear motion mechanism 4a has been changed from a pressure decreasing motion to a pressure increasing motion. More specifically, for example, by use of an angle estimation value from the angle estimator 5, the pressure increase/decrease switching determination unit 19a determines, as the state where the pressure increase and the pressure decrease have been switched, between a state where the changing direction of the motor angle of the electric motor 3 has been changed from the pressure-increasing direction to the pressure-decreasing direction and a reverse state thereof.

The control switching unit 19b has a function of appropriately switching a load estimation function in accordance with the determination or the like by the pressure increase/decrease switching determination unit 19a. Specifically, for example, in a state where control is being performed by use of the first estimation correlation (load sensor correlation during pressure increase) in the direct load estimator 17 during pressure increase of the brake load of the electric brake actuator 1, if switching from pressure increase to pressure decrease occurs, hysteresis occurs in the output of the load sensor 6. Therefore, the control switching unit 19b switches the control to the brake load control that uses the indirect load estimator 18 which does not use the output of the load sensor 6. That is, a switch 20 is switched such that the load estimation value to be inputted to the brake load controller 13 is inputted from the indirect load estimator 18. This switching of the switch 20 is performed by the control switching unit 19b. The switch 20 can be considered as a conceptual description and can be also implemented, not as a physical switch, but as a branching process in a data flow in a computing unit.

Then, when the electric motor 3 rotates in the pressure-decreasing direction by an amount greater than a predetermined amount, the output of the load sensor 6 substantially matches the second estimation correlation (load sensor correlation during pressure decrease). Thus, the control switching unit 19b switches the switch 20 such that the output of the direct load estimator 17 is inputted to the brake load controller 13, and the brake load controller 13 performs brake load control by use of the load sensor correlation during pressure decrease.

Also when pressure decrease is changed to pressure increase, hysteresis occurs in the output of the load sensor 6, similar to the case where pressure increase is changed to pressure decrease. Therefore, the control switching unit 19b performs switching, similar to the above-described case where the pressure increase and pressure decrease are reversed. Other than this, as for a predetermined condition for switching the indirect load estimator 18 to the direct load estimator 17, a condition that not the motor angle of the electric motor 3 but the output of the load sensor 6 has changed by an amount greater than a predetermined amount may be used, for example.

Each function-attaining section or portion configuring the electric brake control device 2 having the above-described configuration is specifically configured with a hardware circuit or a software function on a processor (not shown) which enables calculation and output of a result thereof, with use of a LUT (Look Up Table) implemented by software or hardware, or a prescribed transform function contained in a library of software or hardware equivalent thereto, and, as necessary, a comparison function or a four arithmetic operation function in the library or hardware equivalent thereto, etc. For example, each function-attaining section or portion configuring the electric brake control device 2 having the above-described configuration is preferably implemented by a computing unit such as a microcomputer, FPGA, DSP, or the like. Accordingly, an inexpensive and high-performance configuration is preferably realized.

Figure 2A:
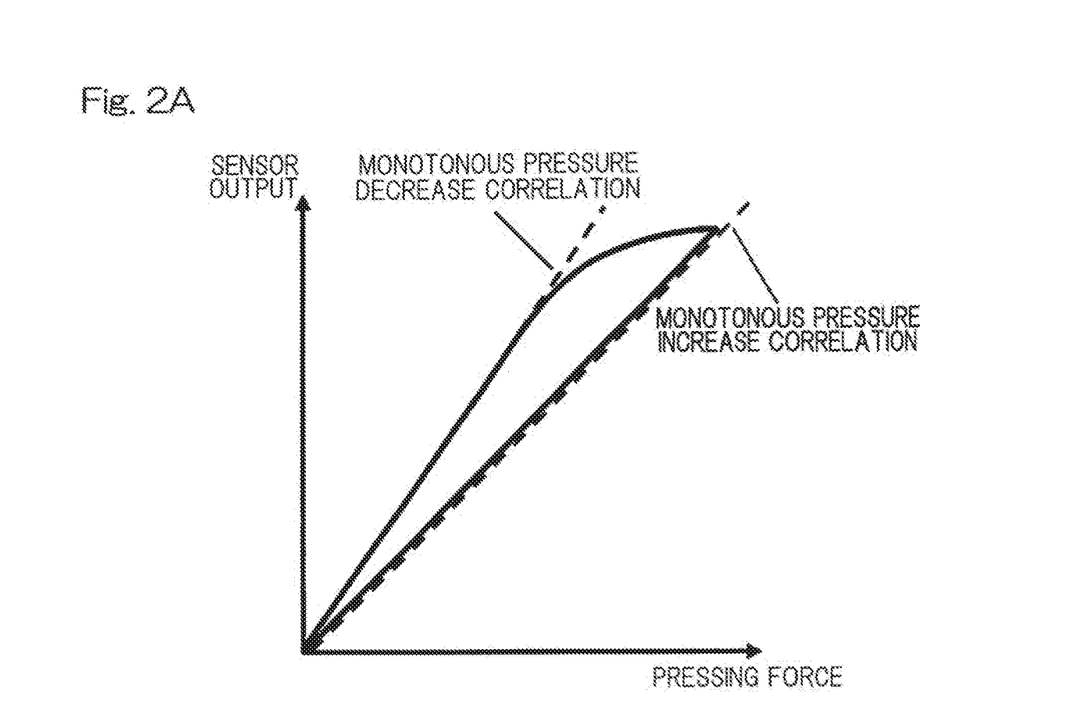
FIG. 2A is a graph showing hysteresis and monotonous increase and decrease in the relationship between pressing force and sensor output in an electric brake.
Figure 2B:
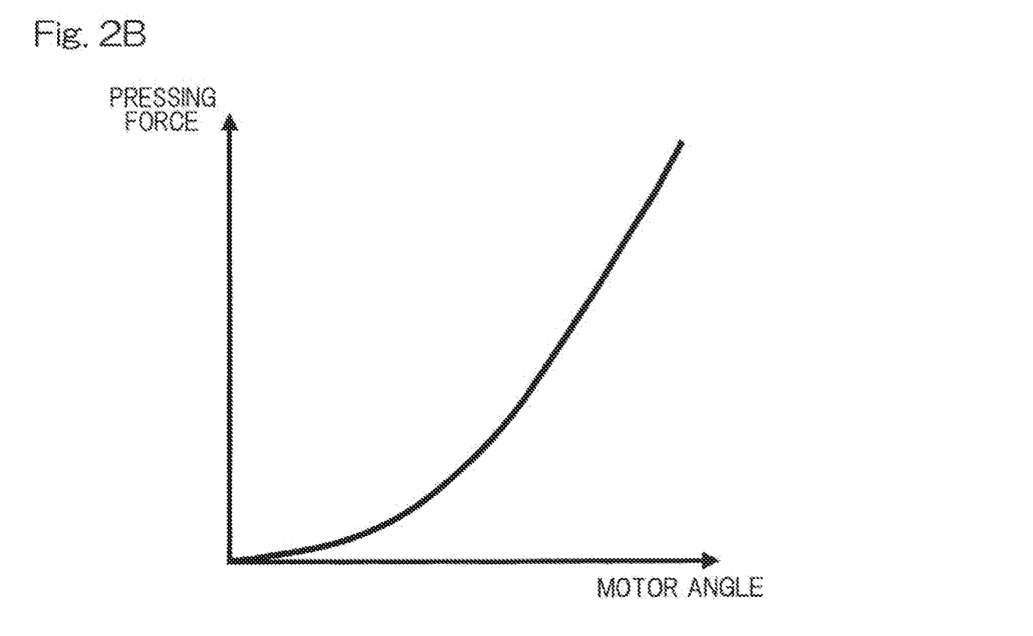
FIG. 2B is a graph showing a relationship between motor angle and pressing force in an electric brake.

An example of brake operation configured as above is described. FIG. 2A shows a correlation between the pressing force (brake load) and the output of the load sensor 6. This correlation includes: relatively linear load sensor output correlations (monotonous pressure increase correlation, monotonous pressure decrease correlation) during monotonous pressure increase and monotonous pressure decrease; and nonlinear hysteresis between the monotonous pressure increase correlation and the monotonous pressure decrease correlation. FIG. 2B shows a correlation between the motor angle of the electric motor 3 and the pressing force (brake load). In general, the pressing force increases in accordance with increase in the motor angle, but the increase rate of the pressing force also increases in accordance with increase in the motor angle, and thus, a nonlinear relationship curve is obtained.

Figure 3A:
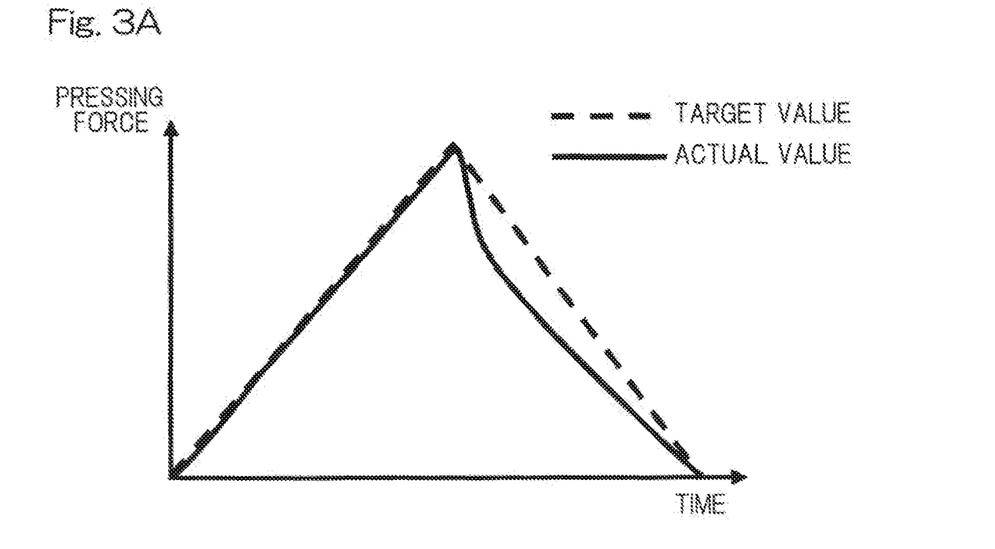
FIG. 3A is a graph showing a relationship between time and pressing force when conventional feedback control is performed.
Figure 3B:
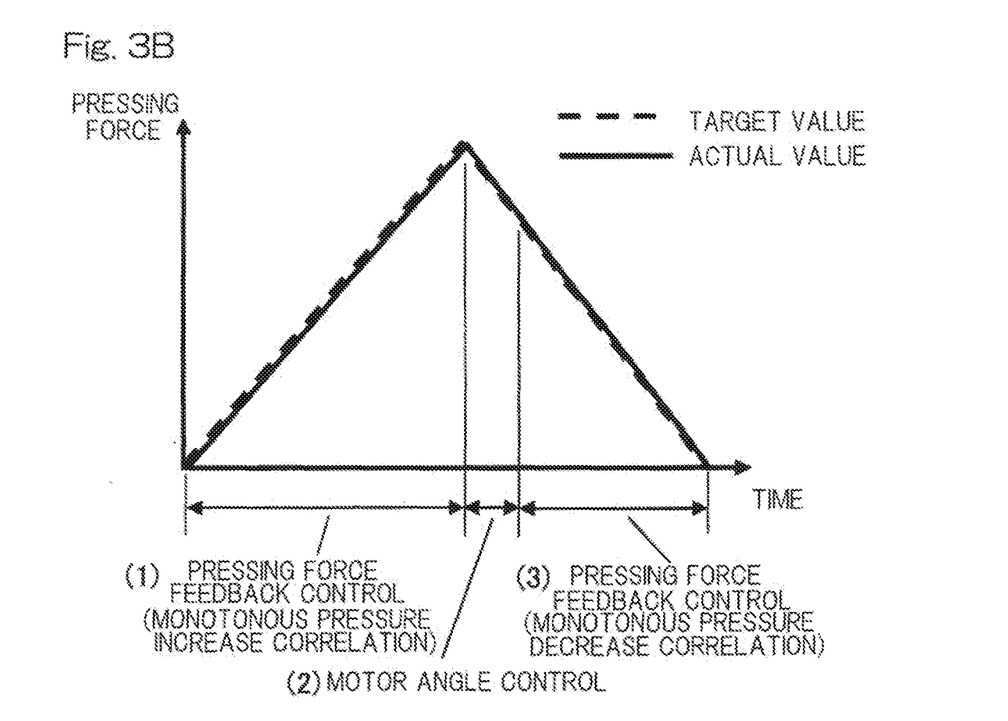
FIG. 3B is a graph showing a relationship between time and pressing force in the present embodiment.

FIG. 3A and FIG. 3B each show an operation example of the electric brake device in a case where the indirect load estimator 18, in FIG. 1, based on the correlation between the pressing force (brake load) and the motor angle of the electric motor 3 is used. In each of FIG. 3A and FIG. 3B, the broken line indicates the target value of the pressing force (brake load), and the solid line indicates the actual value of the pressing force (brake load). FIG. 3A shows an example in which the pressing force (brake load) is controlled by use of only the estimation value from the direct load estimator 17 shown in FIG. 1. In this case, due to the hysteresis characteristic shown in FIG. 2A, in the state where pressure increase is changed to pressure decrease, the actual value of the pressing force (brake load) deviates greatly from the target value, and the control accuracy for the pressing force (brake load) is reduced.

FIG. 3B shows a case where the present embodiment is applied to FIG. 3A. In this case, while the pressing force (brake load) monotonously increases (section (1)), pressing force feedback control which uses the estimation value from the direct load estimator 17 is performed. In a state until the drive amount of the electric brake actuator 1 reaches a predetermined amount (section (2)) after the pressure increase operation and the pressure decrease operation has been switched (in the present embodiment, after switching has been performed by the control switching unit 19b in line with the determination result by the pressure increase/decrease switching determination unit 19a), motor angle control, i.e., follow-up control based on the indirect load estimator 18, is performed. While the pressing force (brake load) monotonously decreases (section (3)) after the drive amount has reached the predetermined amount, the pressing force feedback control is performed again. Therefore, the hysteresis characteristic during the change from monotonous increase to monotonous decrease, in the section (3), does not have influence thereon, the actual value of the pressing force (brake load) substantially matches the target value, and the control accuracy for the pressing force (brake load) is ensured. Also when motor current control is performed in the section (2) instead of the motor angle control, control similar to the motor angle control can be performed.

As described above, according to the present embodiment, since the influence due to the hysteresis in the load sensor 6 is appropriately compensated for, the control accuracy of the electric brake is improved. In addition, since the hysteresis in the load sensor 6 is allowed in this manner, designing is facilitated, and low costs and space-saving designing are enabled. Therefore, if the present embodiment is applied to braking of automobile wheels, improvement in the safety and improvement in the driving feeling can be attained.

Supplemental description of the indirect load estimator 18 is given. For example, the correlation between the brake load and the motor angle changes in accordance with the temperature of the electric brake actuator 1, the wear state of the friction member 8 (see FIG. 4), and the like. In addition, for example, the correlation between the brake load and the motor current changes depending on the temperature of the motor, the sliding resistance of each unit of the electric brake actuator 1, or the like. That is, it is difficult to perform fine brake load control only by use of the indirect load estimator 18. However, if the estimation of relative change is performed in a limited range (section (2)) and conditions as in the present embodiment, relatively favorable brake load estimation can be performed.

Although a preferable embodiment has been described with reference to the drawings, numerous additions, changes, or deletions can be made without departing from the gist of the present invention. Accordingly, such additions, changes, or deletions are to be construed as included in the scope of the present invention.

REFERENCE NUMERALS

1 . . . electric actuator
2 . . . electric brake control device
3 . . . electric motor
4 . . . friction member operator
5 . . . angle estimator
6 . . . load sensor
7 . . . brake rotor
8 . . . friction member
9 . . . brake operator
11 . . . main controller
12 . . . load converter
13 . . . brake load controller
14 . . . motor current controller
16 . . . current estimator
17 . . . direct load estimator
18 . . . indirect load estimator
19 . . . hysteresis interpolator
17a . . . first-estimation-correlation-using estimation unit
17b . . . second-estimation-correlation-using estimation unit
19a . . . pressure increase/decrease switching determination unit
19b . . . control switching unit

What is claimed is:
1. An electric brake device comprising:
an electric brake actuator and an electric brake control device,
the electric brake actuator including
a brake rotor,
a friction member to be brought into contact with the brake rotor,
an electric motor, a friction member operator configured to bring the friction member and the brake rotor into contact with each other by the electric motor, and a load sensor configured to detect a value that corresponds to a pressing force generated at a contact face between the friction member and the brake rotor by the friction member operator, the electric brake control device including a main controller configured to perform follow-up control on the pressing force at the contact face between the friction member and the brake rotor, in accordance with a command value provided from a brake operator, wherein the electric brake control device includes a direct load estimator configured to estimate the pressing force, using an output of the load sensor, an indirect load estimator configured to estimate the pressing force without using the output of the load sensor, and a hysteresis interpolator, the direct load estimator includes a first-estimation-correlation-using estimation unit configured to estimate the pressing force on the basis of a first estimation correlation, which is a correlation between a pressure increase amount of the pressing force and an output change of the load sensor, and a second-estimation-correlation-using estimation unit configured to estimate the pressing force on the basis of a second estimation correlation, which is a correlation between a pressure decrease amount of the pressing force and an output change of the load sensor, the hysteresis interpolator includes a pressure increase/decrease switching determination unit and a control switching unit, the pressure increase/decrease switching determination unit performs determination as to switching from a pressure increase operation to a pressure decrease operation, for the pressing force, and determination as to switching from a pressure decrease operation to a pressure increase operation, for the pressing force, and when the main controller performs load follow-up control based on the pressing force estimated by the first or second-estimation-correlation-using estimation unit and outputted by the direct load estimator, the control switching unit causes the main controller to perform follow-up control based on the indirect load estimator, in a state until a drive amount of the electric brake actuator reaches a predetermined amount after the switching between the pressure increase operation and the pressure decrease operation in line with a determination result by the pressure increase/decrease switching determination unit has been performed, and the control switching unit causes the main controller to perform, in a state after the drive amount of the electric brake actuator has exceeded the predetermined amount, load follow-up control based on the pressing force estimated by the first or second-estimation-correlation-using estimation unit of a correlation type different from that used before the switching between the pressure increase operation and the pressure decrease operation has been performed.

2. The electric brake device as claimed in claim 1, comprising an angle estimator configured to estimate an angle of the electric motor, wherein the indirect load estimator estimates the pressing force on the basis of a correlation between the pressing force and the angle of the electric motor estimated by the angle estimator.

3. The electric brake device as claimed in claim 1, comprising a current estimator configured to estimate a current of the electric motor, wherein the indirect load estimator estimates the pressing force on the basis of a correlation between the pressing force and the current of the electric motor.

4. The electric brake device as claimed in claim 1, comprising an angle estimator configured to estimate an angle of the electric motor, wherein by use of the angle estimated by the angle estimator, the pressure increase/decrease switching determination unit determines switching between a pressure increase operation and a pressure decrease operation in a situation where a changing direction of the angle of the electric motor is reversed.

5. The electric brake device as claimed in claim 1, comprising an angle estimator configured to estimate an angle of the electric motor, wherein on the basis of a change amount of the angle of the electric motor, the control switching unit performs determination as to a drive amount of the electric brake actuator at a time of performing switching from the indirect load estimator to the direct load estimator.

6. The electric brake device as claimed in claim 1, wherein on the basis of a change amount of the output of the load sensor, the control switching unit performs determination as to a drive amount of the electric brake actuator at a time of performing switching from the indirect load estimator to the direct load estimator.

7. The electric brake device as claimed in claim 1, wherein the electric brake actuator performs braking of a wheel of an automobile.

* * * * *